United States Patent [19]

Shinno et al.

[11] Patent Number: 5,041,179

[45] Date of Patent: Aug. 20, 1991

[54] METHOD FOR CONTROLLING TAPE AFFIXING DIRECTION OF AUTOMATIC TAPE AFFIXING APPARATUS

[75] Inventors: Nobuo Shinno; Toshikazu Shigematsu, both of Osaka, Japan

[73] Assignees: Shinnippon Koki Kabushiki Kaisha; Shinnippon Koki Co., Ltd., both of Osaka, Japan

[21] Appl. No.: 355,714

[22] Filed: May 22, 1989

[30] Foreign Application Priority Data

May 24, 1988 [JP] Japan .................... 63-126640

[51] Int. Cl.$^5$ ............................ B32B 31/00
[52] U.S. Cl. .................... 156/64; 156/361; 156/574; 364/167.01
[58] Field of Search ............ 156/64, 361, 574, 523; 364/167.01

[56] References Cited

U.S. PATENT DOCUMENTS

| | | |
|---|---|---|
| 3,457,137 | 7/1969 | McCarthy et al. . |
| 3,574,040 | 4/1971 | Chitwood et al. . |
| 3,752,728 | 8/1973 | Smirnov et al. . |
| 3,755,060 | 8/1973 | Bullock . |
| 3,775,219 | 11/1973 | Karlson et al. . |
| 3,783,783 | 1/1974 | Hamisch . |
| 3,810,805 | 5/1974 | Goldsworthy et al. . |
| 3,970,831 | 7/1976 | Hegyi . |
| 3,975,226 | 8/1976 | Boettcher . |
| 3,996,089 | 12/1976 | More et al. . |
| 4,133,711 | 1/1979 | August et al. . |
| 4,151,031 | 4/1979 | Goad et al. . |
| 4,208,238 | 6/1980 | August et al. . |
| 4,239,580 | 12/1980 | Ives . |
| 4,259,144 | 3/1981 | Ballentine . |
| 4,285,752 | 8/1981 | Higgins . |
| 4,292,108 | 9/1981 | Weiss et al. . |
| 4,317,695 | 3/1982 | Madhu et al. . |
| 4,351,688 | 9/1982 | Weiss et al. . |
| 4,382,836 | 5/1983 | Frank . |
| 4,419,170 | 12/1983 | Blad . |
| 4,461,669 | 7/1984 | Dontscheff . |
| 4,491,493 | 1/1985 | Eaton . |
| 4,508,584 | 4/1985 | Charles . |
| 4,531,992 | 7/1985 | Eaton . |
| 4,534,813 | 8/1985 | Williamson et al. ............ 156/191 |
| 4,541,886 | 9/1985 | Marlow et al. . |
| 4,557,783 | 12/1985 | Grone et al. . |
| 4,588,466 | 5/1986 | Eaton . |
| 4,627,886 | 12/1986 | Grone et al. . |
| 4,696,707 | 9/1987 | Lewis et al. ..................... 156/574 |
| 4,750,965 | 6/1988 | Pippel et al. .................... 156/574 |

FOREIGN PATENT DOCUMENTS 58-45057 3/1983 Japan .
62-37161 2/1987 Japan .

OTHER PUBLICATIONS

Murphy, R. P., "Natural Path Report", 2-52700-/4AVO-167, Oct. 1984.

Primary Examiner—Richard V. Fisher
Assistant Examiner—Todd J. Burns
Attorney, Agent, or Firm—Jordan and Hamburg

[57] ABSTRACT

A method for controlling the tape affixing direction of an automatic tape affixing apparatus including a tape affixing head movable in X axis, Y axis, Z axis, A axis and C axis and a control device for moving the tape affixing head on an adhesion form, the tape affixing head carrying a tape supply reel, a tape-take-up reel, a tape presser roller and a tape drive roller includes the steps of; calculating a normal vector of each fine section of a surface of the adhesion form and a vector of a ridge between fine sections based on X-, Y- and Z- coordinate values of points in fine sections, the fine section being formed by dividing the surface of the adhesion form in the form of a lattice; calculating the affixing direction vector of a control point of a tape from the normal vector and the ridge vector; and controlling the moving course of the tape affixing head in accordance with the affixing direction vector. Accordingly, the tape affixing direction can be controlled with high accuracy.

5 Claims, 11 Drawing Sheets

METHOD FOR CONTROLLING TAPE AFFIXING DIRECTION OF AUTOMATIC TAPE AFFIXING APPARATUS

BACKGROUND OF THE INVENTION AND RELATED ART STATEMENT

The present invention relates to a method for controlling the tape affixing direction of an automatic tape affixing apparatus for automatically affixing a tape of composite material on the surface of an adhesion form having various contours to make a lamination of the tape.

In recent years, lightweight plate materials have been produced from a tape of composite material, i.e. a tape prepared by impregnating carbon fiber, aramid fiber or like reinforcing fiber with a thermosetting resin, by affixing the tape on the surface of an adhesion form (body) having specified contours to make a lamination, and thereafter subjecting the lamination to a curing treatment with application of heat and pressure. Japanese Unexamined Patent Application No. 58-45057, for example, discloses a method for automatically affixing such a tape of composite material. With this method, the tape is continuously paid off from a reel and pressed against the surface (curved surface) of an adhesion form with a press roller, the press roller is moved along a predetermined path to successively affix tape portions without leaving a clearance therebetween, and the tape affixing direction is changed from layer to layer, whereby a lamination is obtained.

In the above-mentioned method, the tape consists of a filament tape and a backing paper. In affixing the tape, the filament tape is affixed on the adhesion form while the backing paper is taken up by another reel. However, it can not be expected that long fibers used for the filament tape stretches and contracts following the surface contour. Consequently, when the tape is affixed on a conical projection 80 on an adhesion form 8 as shown in FIG. 5, natural path 100 in which the tape is affixed without wrinkles changes before and after the conical projection 80.

On the other hand, it is required that tape strips be affixed with a minute clearance therebetween by pressing the tape strips against the surface of the adhesion form or curved surface while moving a presser roller along the natural path. If the actual moving path of the presser roller is different from the natural path, the tape may deviate widthwise at the presser roller portion, i.e., sidewise deviation or wrinkles occur in a worse case. Accordingly, if the tape deviates sidewise, a minute clearance will not be maintained between tape portions but a large clearance occurs, or conversely, tape strips overlap one another, further the tape is locally unpressed by the presser roller and is then incompletely adhered. It could be seen that even if such incomplete lamination is treated for curing, a plate can not be obtained which has a specified quality, for example, a necessary strength.

An actual adhesion form has a complicated three-dimensional contour. Accordingly, the tape affixing course is determined after the natural path is calculated as follows.

When the tape affixing course is determined based on the natural path with respect to an adhesion form having two intersecting planes as shown in FIG. 6, any one of the following conditions is required to affix a tape 10 across an intersecting line of the two planes or ridge without wrinkles;

(a) respective lengths $l_1$ and $l_2$ of the opposite sides of the tape 10 are the same;

(b) incident angles $\theta_1$ and $\theta_2$ of the tape 10 with respect to the ridge are the same.

In the case of calculating the natural path based on the condition (a), the tape course is difficult to determine at one calculation. There is no other way than that the tape course is approximately found out by repeated calculations. This means that the processing time of a computer becomes longer and that only approximate course can be obtained, in other words, accurate course can not be obtained. Additionally, since an actual adhesion form has complicated three-dimensional contours and configuration within both sides of the tape is ignored in the above-mentioned calculation based on the condition (a), an optimum natural path can not be obtained. Thus, it is inappropriate to calculate the natural path under the condition (a).

SUMMARY OF THE INVENTION

It is an object of the present invention to provide a method for controlling the tape affixing direction so as to accurately follow the natural path based on the condition (b) in which incident angles of the tape with respect to a ridge between two planes are the same.

According to the present invention, a method for controlling the tape affixing direction of an automatic tape affixing apparatus including a tape affixing head movable in X axis, Y axis, Z axis, A axis and C axis and a control device for moving the tape affixing head on an adhesion form, the tape affixing head carrying a tape supply reel, a tape take-up reel, a tape presser roller and a tape drive roller includes the steps of; calculating a normal vector of each fine section of a surface of the adhesion form and a vector of a ridge between fine sections based on X-, Y- and Z- coordinate values of points in fine sections, the fine section being formed by dividing the surface of the adhesion form in the form of a lattice; calculating the affixing direction vector of a control point of a tape from the normal vector and the ridge vector; and controlling the moving course of the tape affixing head in accordance with the affixing direction vector.

Further, the control point may be set at a widthwise middle point of a tape, both side ends of a tape, or at a plurality of positions in a widthwise direction of the tape.

Further, the calculation may be started from a predetermined reference line, and a clearance between adjacent tape affixing courses are controlled on the reference line.

Accordingly, in a method of the present invention, a surface of an adhesion form is finely divided in the form of a lattice, a normal vector of each finely divided section (mesh area) and a vector of a ridge between finely divided sections is then calculated based on X-, Y-, Z- coordinate values of points in finely divided sections, the affixing direction vector of a control point of a tape is calculated from the normal vector and the ridge vector, and the moving course of a tape affixing head controlled in accordance with the affixing direction vector makes it possible to calculate the natural path with high accuracy and ease, and then affix tape on various adhesion forms with high accuracy.

DETAILED DESCRIPTION OF PREFERRED EMBODIMENTS

Figure 2:
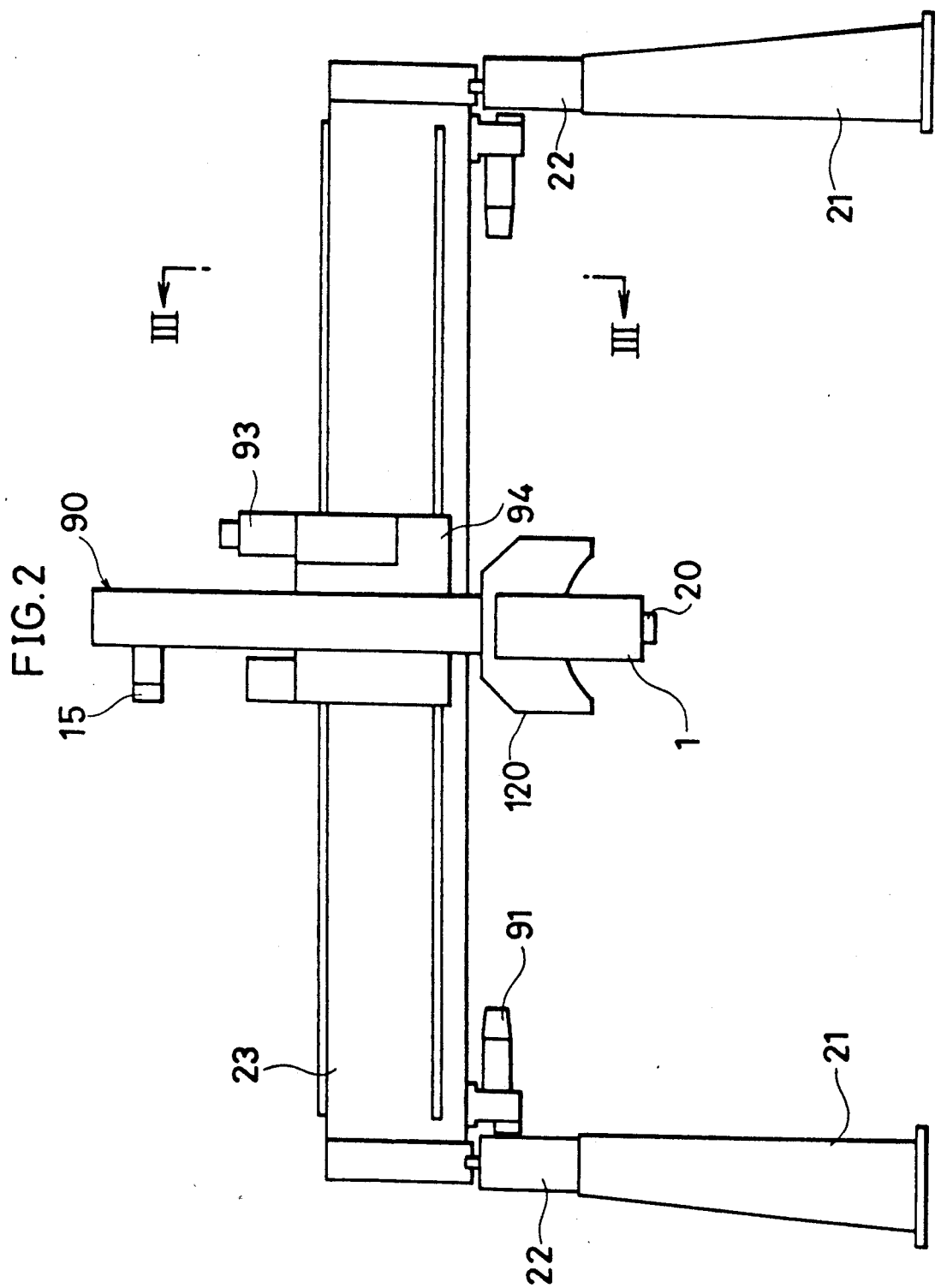
FIG. 2 is an overall schematic elevational view of an apparatus embodying the present invention.
Figure 3:
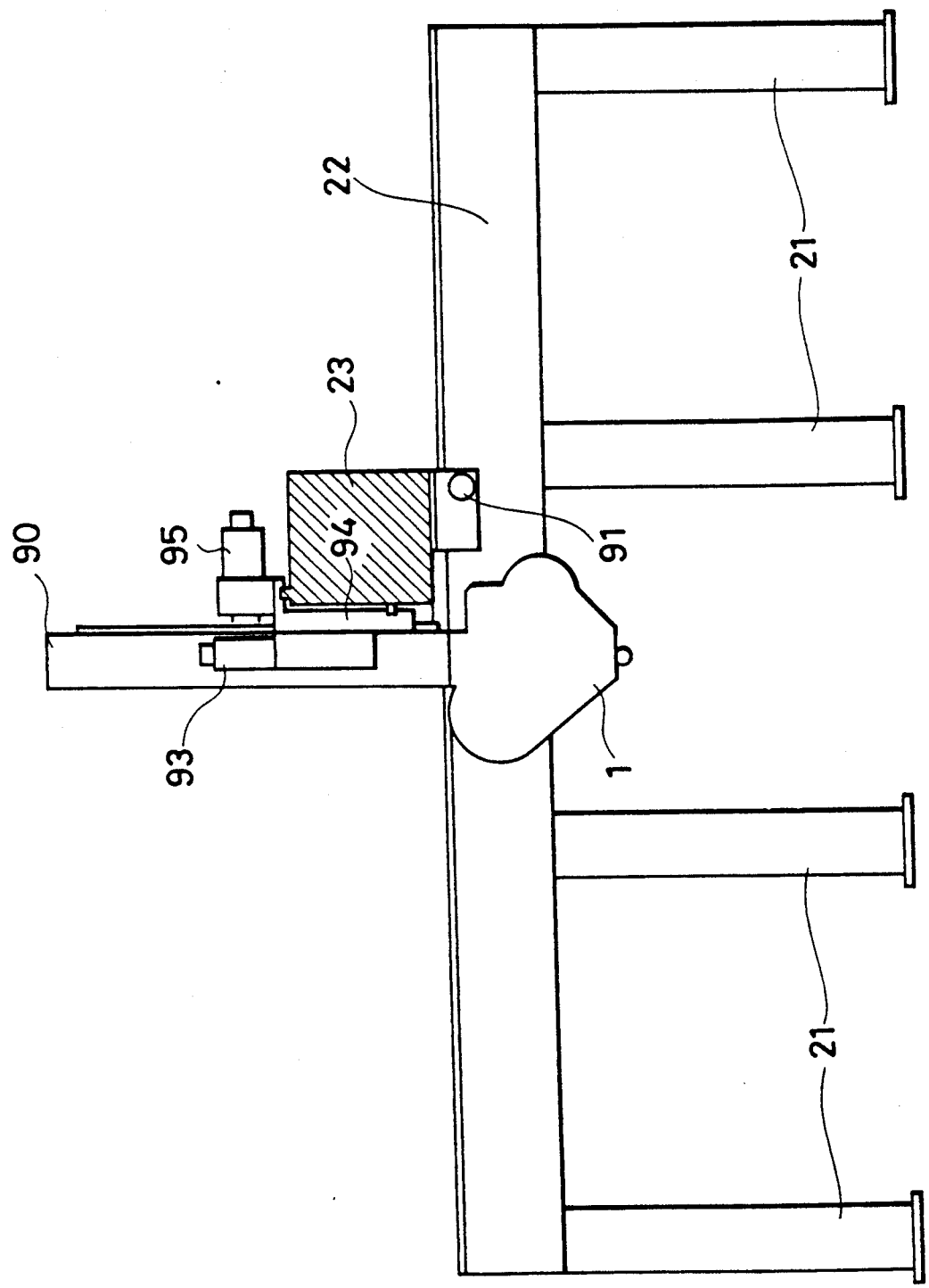
FIG. 3 is a sectional side view taken along the line III—III of FIG. 2.

With reference to FIGS. 2 and 3, a pair of side rails 22 supported by columns 21 are arranged in parallel to each other. A cross rail 23 extends between and is supported by the side rails 22. The cross rail 23 is movable on the side rails 22 by an X-axis servomotor 91 in the direction of X axis (perpendicular to the plane of FIG. 2). A Y-axis saddle 94 mounted on the cross rail 23 is movable by a Y-axis servomotor 93 along the cross rail 23 in the direction of Y-axis (laterally in FIG. 2). A Z-axis saddle 90 mounted on the Y-axis saddle 94 is movable by a Z-axis servomotor 95 in the direction of Z axis (vertically).

A head saddle 20 is attached to a lower portion of the Z-axis saddle 90 with rotatable about C axis (an axis for rotation about Z axis) and driven by a C axis servomotor 15. The tape affixing head 1 is held by the head saddle 120 pivotably about A axis (an axis for pivot about X axis, or a lateral pivotal axis shown in FIG. 2) and driven by an A axis servomotor 121 (shown in FIG. 4).

Figure 4:
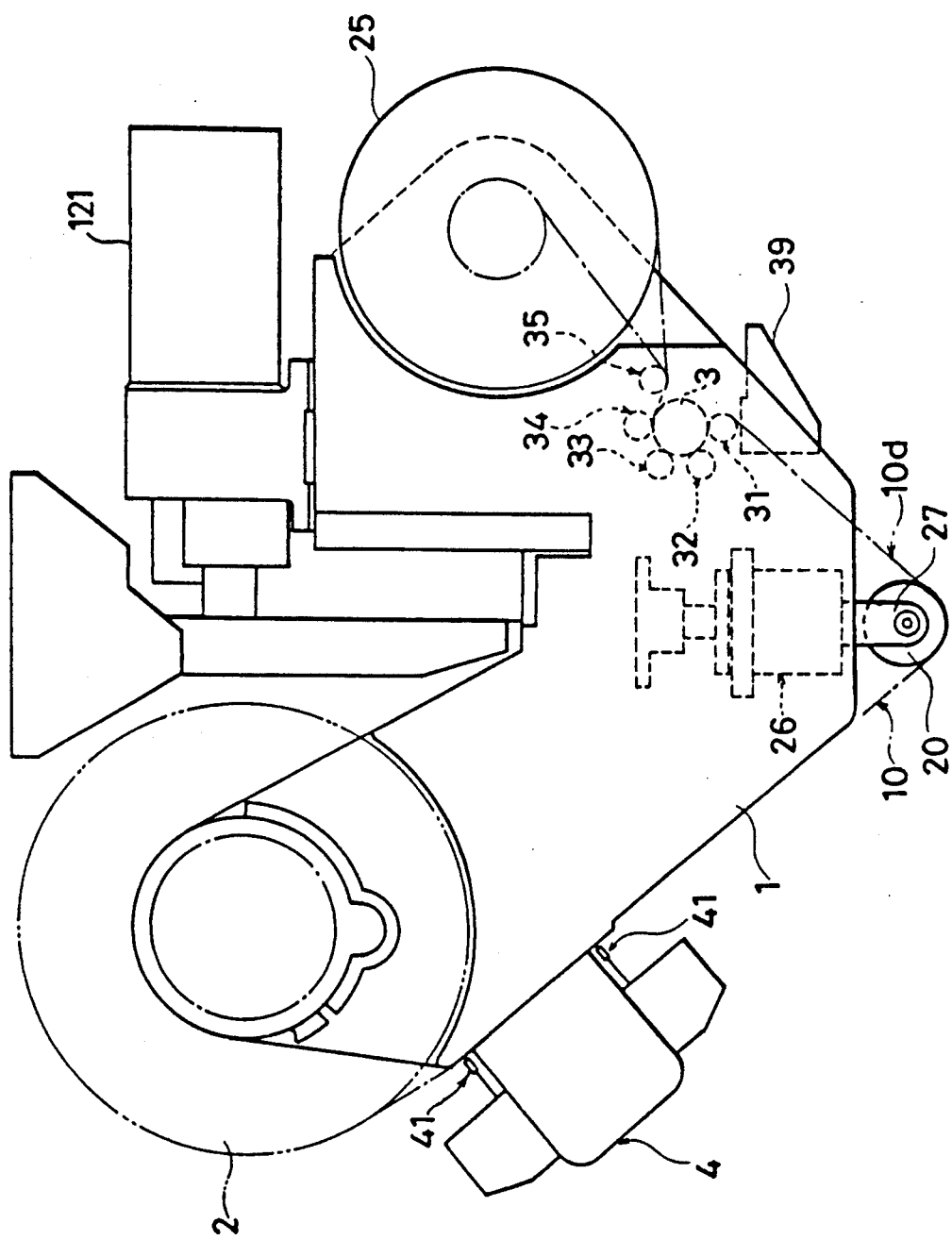
FIG. 4 is a side view of a tape affixing head.
Figure 5:
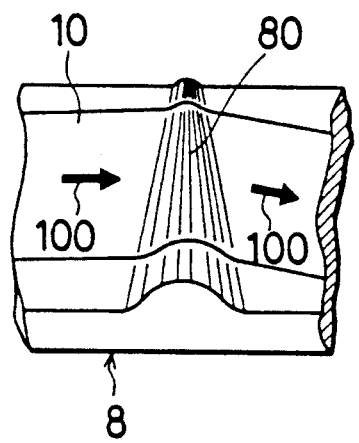
FIGS. 5 to 6 are diagrams illustrating various surfaces of the tape adhesion form.
Figure 6:
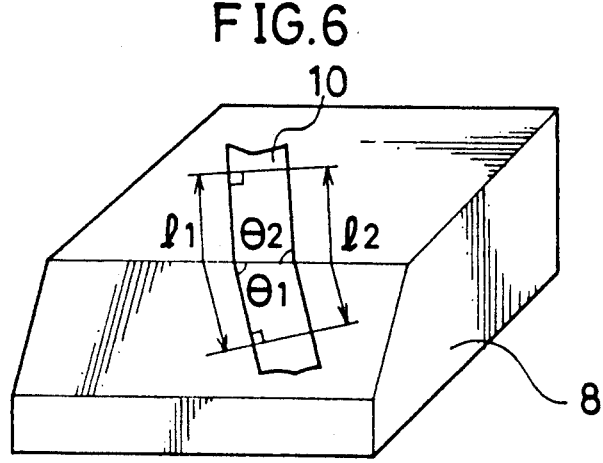
Figure 7:
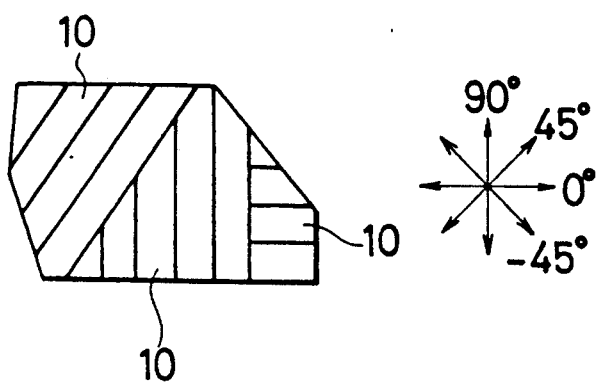
FIG. 7 is a diagram illustrating tape affixing direction.

As shown in FIG. 4, the tape affixing head 1 is provided with a tape supply reel 2 and a take-up reel 25. The tape supply reel 2 carries a roll 10 of double layer tape consisting of composite tape and backing paper and the take-up reel 25 winds up only the backing paper $10a$. The tape 10 paid off from the reel 2 is cut at a predetermined length by cutters 41 of a tape cutting device 4 with the backing paper being not cut. In other words, composite tape only is cut. Cut-off strips of the composite tape are then pressed on an adhesion form by a presser roller 20, and the backing paper $10d$ is run around a drive roller (pinch roller) 3 and then wound on the take-up reel 25. Reference numeral 39 designates a scrap tape collection box.

The presser roller 20 is held by a bracket 27 of a roller carrying member (holding means) 26 attached to the tape affixing head. A plurality of driven rollers 31, 32, 33 and 34 are disposed around the drive roller 3, each of which presses the tape 10 against the peripheral surface of the drive roller 3. An auxiliary roller 35 defines the taking-up direction of the tape 10 from the drive roller 3.

An operation of the apparatus will now be described. X-axis, Y-axis, Z-axis, A-axis and C-axis servomotors 91, 93 and 95, 121 and 15 are actuated to press the presser roller 20 at the forward end of the tape affixing head 1 against the adhesion form and to move the tape affixing head 1 along a predetermined path on the surface of the adhesion form while the tape 10 is fed from the supply reel 2 at a predetermined rate and tension, whereby the tape is affixed on the surface. The moving path of the tape affixing head 1 is controlled in accordance with a signal from a control device described below.

In the above operation, the tape 10 is fed owing to the fact that the backing paper $10a$ which is placed between the drive roller 3 and the driven rollers 31 to 34 is fed by the rotation of the drive roller 3. The backing paper $10a$ is taken up by the take-up reel 25. On the other hand, optimum torque commands are given to servomotors attached to the tape supply reel 2 and the take-up reel 25 so that a desirable tension arises on the tape 10.

Figure 14:
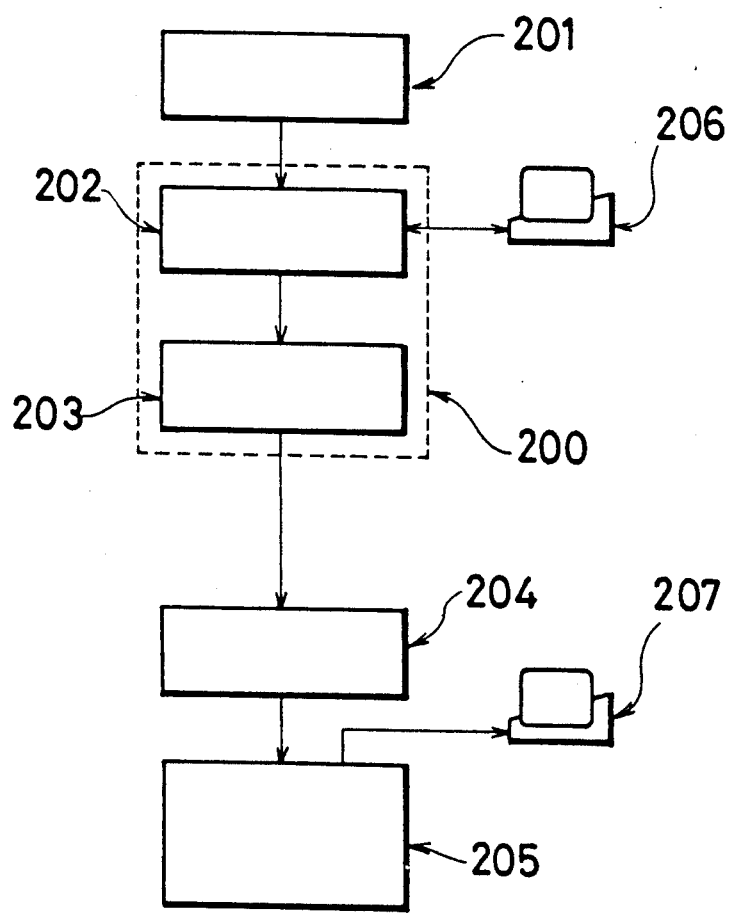
FIG. 14 is a diagram illustrating a control device for controlling the moving path of a tape affixing head.

FIG. 14 is a schematic view showing the control device for controlling the moving path of the tape affixing head 1. Control unit 200 includes a main processor portion 202 for executing natural path calculation and other calculation and a post processor portion 203 for calculating a mechanical coordinate (numerical control data) concerning the movement of the tape affixing head 1 based on CL data, i.e., data concerning the surface of the adhesion form on which the natural path is defined, obtained in the main processor portion 202. Such data are held in the form of software.

Data necessary for the control unit 200 includes surface data 201 having respective X-, Y- and Z- coordinate values of points of a lattice which is formed over the surface of the adhesion form, and other data, such as adhesion area, tape affixing direction, and tape width. The surface data 201 is obtained by CAD system (computer aided design system), or by a three-dimensional coordinate measuring device. The other data concerning tape adhesion area and the like are given from the CAD system or inputted by means of computer terminal 206 having a CRT display in the fashion of dialogue. Also, the terminal 206 can display the tape course of the natural path calculated by the main processor portion 202 or other information.

The mechanical coordinate data (numerical control data) concerning the moving path of the tape affixing head 1, which is used to move the tape affixing head 1 along the natural path, is given to a numerical control unit 204 for controlling the movement of the tape affixing head 1 (the rotation of the servomotor for each axis) of the automatic tape affixing apparatus 205, by use of a punched tape, a magnetic tape, a floppy disc, or an on-line communication.

Figure 1:
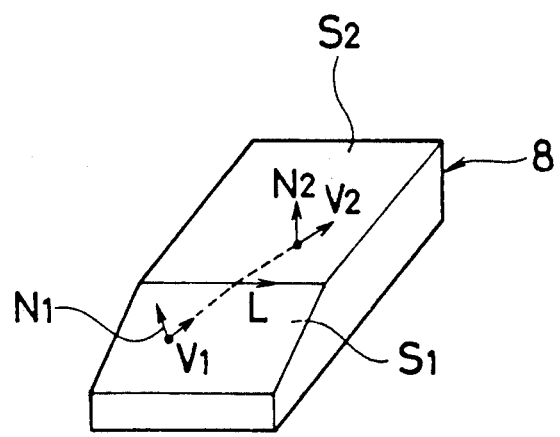
FIG. 1 is a diagram illustrating vectors on surfaces of a tape adhesion form.

In FIG. 1, $N_1$, $N_2$ denote normal unit vectors of respective surfaces $S_1$, $S_2$. $V_1$, $V_2$ denote tape affixing direction unit vectors on the respective surfaces. The vector $V_1$ can be easily calculated by specifying the tape affixing direction.

A vector L along the ridge between the surface $S_1$, $S_2$ is on both the surfaces $S_1$, $S_2$ accordingly, the following equation can be obtained:

$$L = N_1 \times N_2$$

Further, owing to the condition that incident angles of tape with respect to the ridge of both surfaces are identical, the following equation can be obtained:

$$V_1 \cdot L = V_2 \cdot L$$

Since the tape affixing direction vector $V_2$ on the surface $S_2$ is perpendicular to the normal vector $N_2$ on the surface $S_2$, the following equation can be obtained:

$$V_2 \cdot N_2 = 0$$

Accordingly, when the normal vectors $N_1$, $N_2$ on the surfaces $S_1$, $S_2$ and the tape affixing direction vector $V_1$ on the surface $S_1$ are given, the tape affixing direction unit vector $V_2$ on the surface $S_2$ can be easily calculated in accordance with the above-mentioned equations.

A usual adhesion form has a complicated configuration having three-dimensional curved surfaces. The surface of the adhesion form can be considered to be an aggregate of fine planes which correspond to meshes of the lattice. Accordingly, a normal vector of the fine plane can be easily calculated from X-, Y- and Z- coordinate values of each of four points of the fine plane. It could be seen that the natural path can be calculated by repeating the above calculation.

Figure 15:
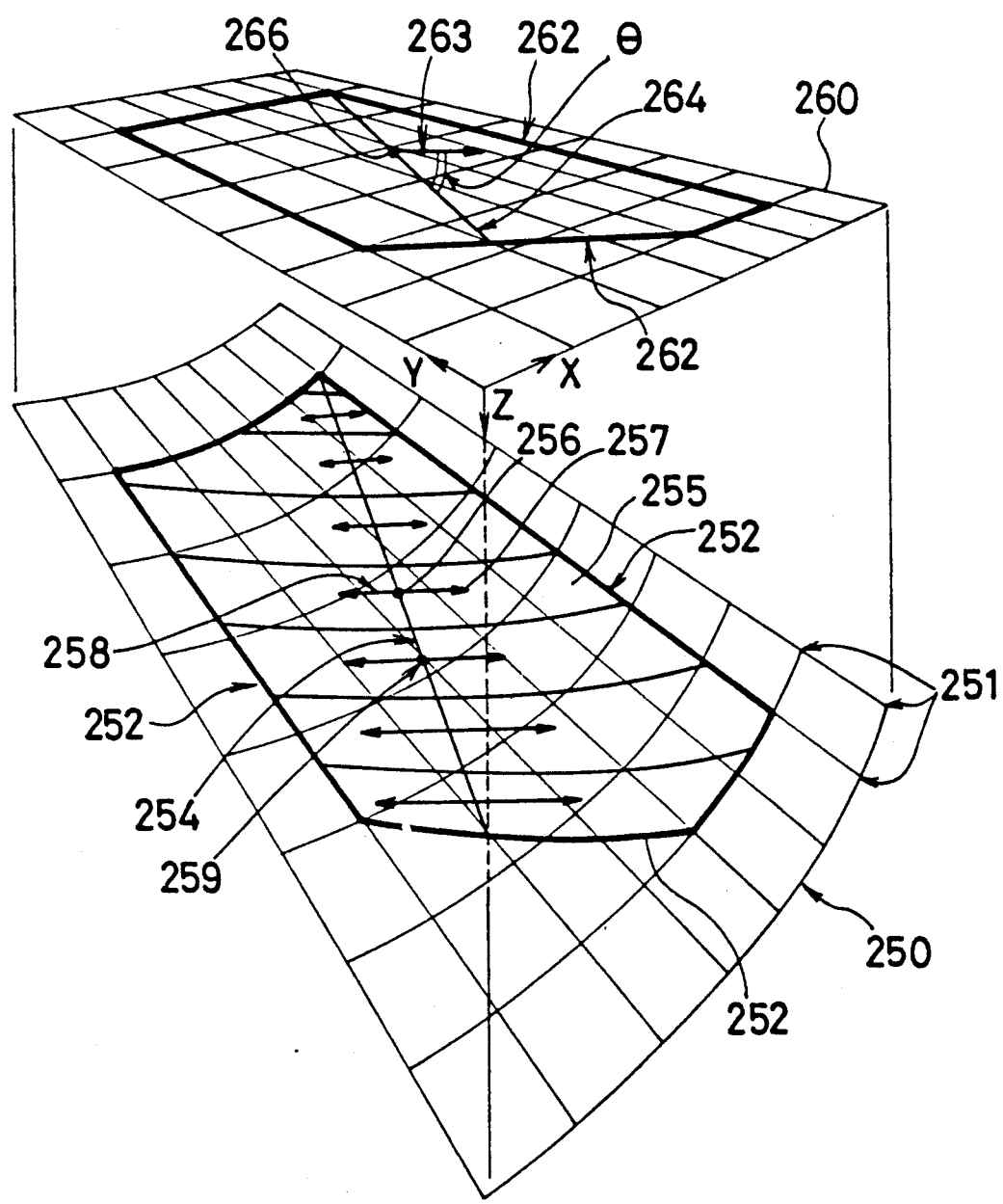
FIG. 15 is a diagram illustrating a method for calculating the tape course.

A specific calculation procedure will be described with reference to a model shown in FIG. 15. The following necessary data are inputted: a surface 251 of an adhesion form 250, an adhesion area 262 on an X-Y plane 260, a tape affixing direction 263, a reference line 264, and a tape width and a clearance between tape courses. Calculation of a tape course 255 is started from a point 256 which is a projection of a point 266 of the reference line 264 on the surface of the adhesion form 250 to a point 257 until one side of an adhesion area 252 which is a projection of the adhesion area 262, thereafter, executed in the reverse direction from the point 256 to the point 258 in the same manner until the other side of the adhesion area 252. The next calculation is started from a point 259 which is apart from the point 256 a distance corresponding to a sum of the tape width and the clearance between tape courses on a reference line 254 which is a projection of the reference line 264 on the surface of the adhesion form. The calculations are repeated in the same manner to obtain tape courses in accordance with the natural path over the whole area of the tape adhesion area.

Figure 8:
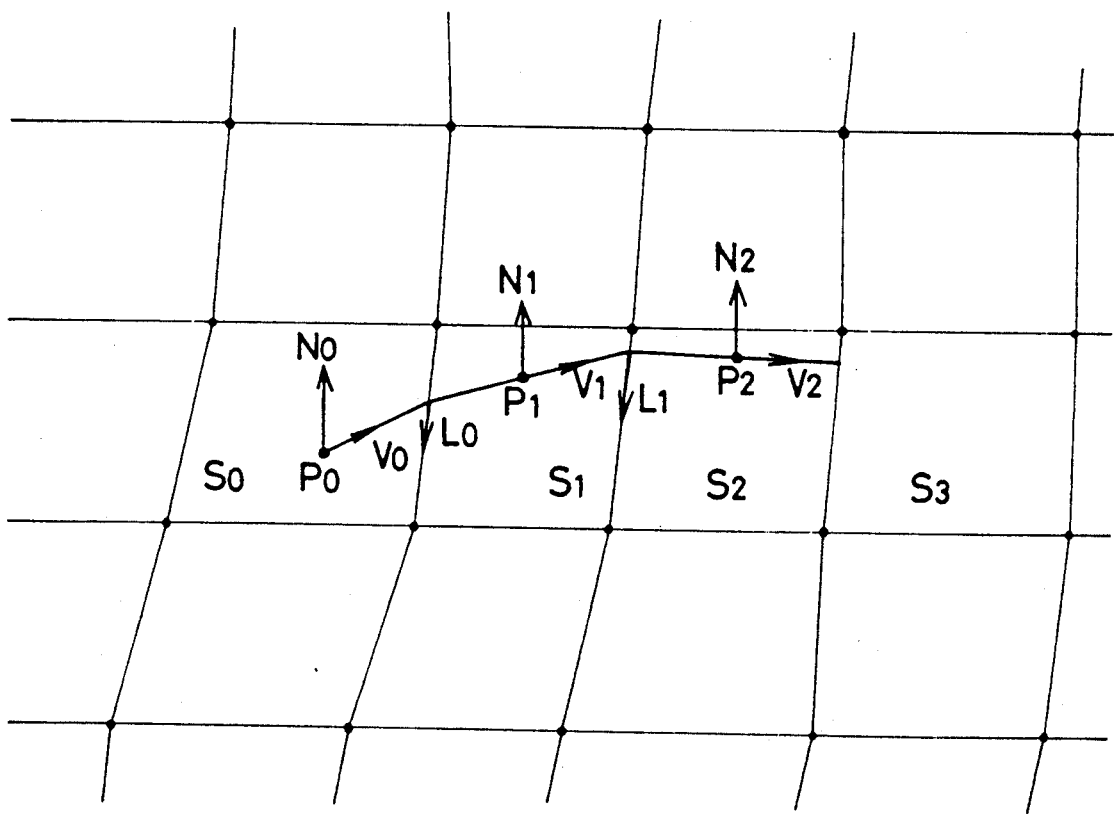
FIG. 8 is a diagram illustrating vectors on a surface of the adhesion form.

FIG. 8 illustrates the calculation of a course on which a tape is affixed from the point 256 to a side of the tape adhesion area 252. Firstly, a tape affixing direction vector $V_0$ a surface $S_0$ having a starting point $P_0$ is calculated from the tape affixing direction on the surface $S_0$ and a normal vector $N_0$ on the surface $S_0$. The tape affixing direction vector $V_1$ of the surface $S_1$ is calculated from the normal vectors $N_0$, $N_1$ of the surfaces $S_0$, $S_1$, a ridge vector $L_0$ calculated from them, and the tape affixing direction vector $V_0$ on the surface $S_0$. Similarly, tape affixing directions $V_2$, $V_3$ . . . are calculated in order of surfaces $S_2$, $S_3$ . . . Consequently, a tape course along the natural path is obtained from a train of tape affixing direction vector.

In the above-mentioned calculation, tape width is omitted and a tape is considered as a line. However, even when the tape width is taken into a consideration, the above-mentioned calculation is basically applicable.

Figure 10:
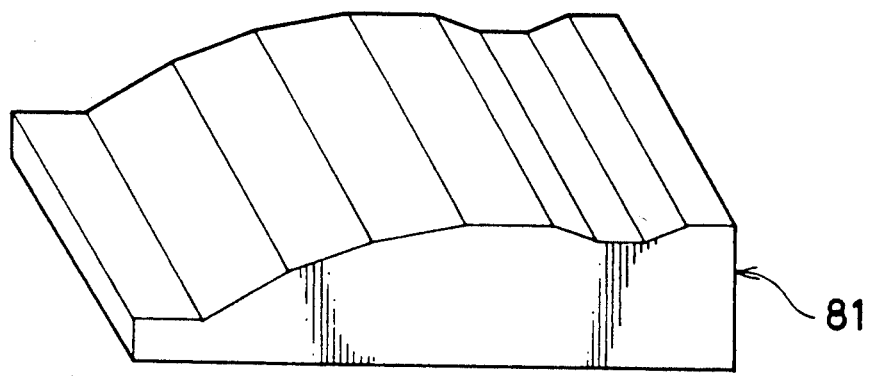
Figure 11:
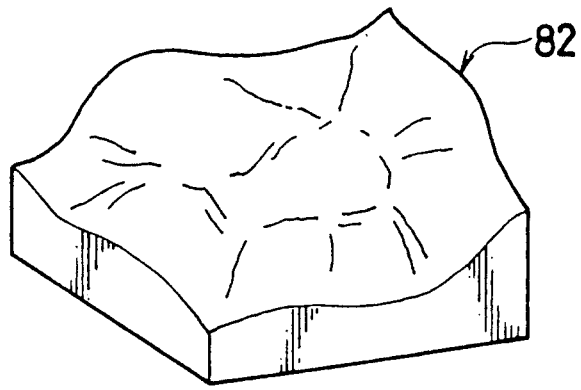

The above-mentioned calculation is satisfactorily applicable for an adhesion form 81 of a single contour in which cross sections taken parallel to one another are the same as shown in FIG. 10. In an adhesion form 82 of a double contour in which cross sections taken parallel to one another are different as shown in FIG. 11, a great number of fibers of a composite tape tends to independently and freely follow the natural path obtained by the above-mentioned calculation. However, the tape is one body having a width. Accordingly, one natural path course is required to determine for one tape course.

Figure 9:
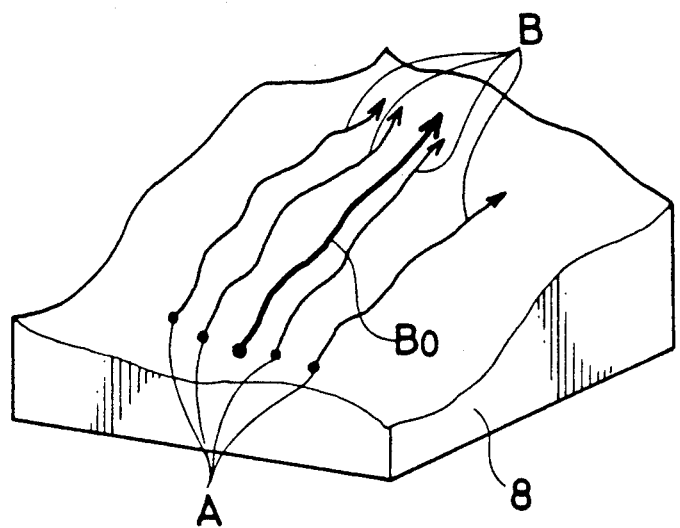
FIGS. 9 to 11 are diagrams illustrating various surfaces of the tape adhesion form and the tape affixing direction.

In an adhesion form 8 whose curvature variation is relatively gentle as shown in FIG. 9, natural paths B of control reference points A arranged in the widthwise are calculated. A natural path $B_0$ for the tape 10 is obtained by calculating a weighted mean of the natural paths B.

However, in the case of an adhesion form having great unevenness, this calculation involves great errors. This is because there is occasions that control points of the determined natural path course run off the natural path of the control points. There is an occasion that a control point is out of the tape.

Figure 12:
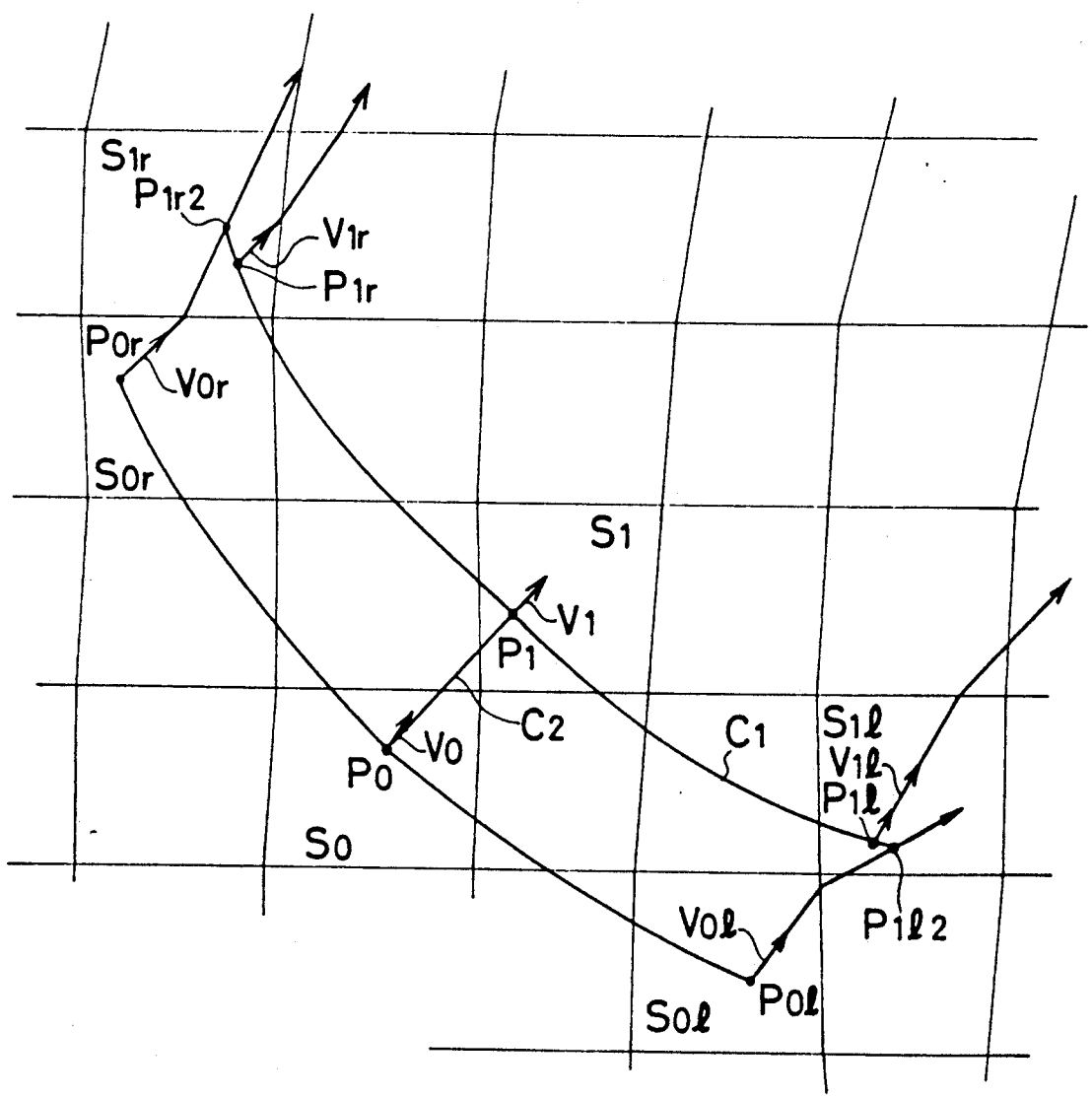
FIGS. 12 and 13 are diagram illustrating vectors on surfaces of the tape adhesion form, respectively.

The following calculation provides the natural path for a tape by executing the above-mentioned calculation on every fine plane of the lattice. A calculation in which control points are set at the opposite side of the tape will be described with reference to FIG. 12.

(1) A tape affixing direction unit vector $V_0$ at a starting point $P_0$ on a surface $S_0$ is calculated.

The vector $V_0$ is calculated from an affixing direction angle specified on an X-Y plane and a normal vector of the surface $S_0$.

(2) Points Por and Pol are obtained which satisfy the following formula on a intersecting line of a plane perpendicular to the vector $V_0$ and the surface of the adhesion form:

$$P_0 Por = P_0 Pol = W/2$$

where W is the width of the tape, $P_0$ is the widthwise middle point of the tape, Por is a right side end point of the tape, Pol is a left side end point of the tape, $P_0$ Por and $P_0$ Pol are arc length on the intersecting line.

(3) From relation between the surfaces $S_0$, and Sor and relation between the surfaces $S_0$ and Sol where $S_0$, Sor and Sol are surfaces carrying the points $P_0$, Por and Pol, respectively, tape affixing direction vectors Vor, Vol at the points Por and Pol are calculated as follows:

$$Vor \cdot Nor = 0$$

$$V_0 \cdot (N_0 \times Nor) = Vor \cdot (N_0 \times Nor)$$

$$|Vor| = 1$$

where $N_0$ is a normal vector of the surface $S_0$, Nor is a normal vector of the surface Sor and $V_0$ is a tape affixing direction vector of the middle point of the tape on the surface $S_0$.

Since $N_0$, Nor and $V_0$ are known unit vectors, Vor can be calculated in accordance with the above three equations. Similarly, Vol can be calculated.

(4) Natural paths of the right and left side end points are calculated based on Vor and Vol in a predetermined distance or one step.

(5) A point $P_1 r_2$ on a surface $S_1 r$ and a point $P_1 l_2$ on a surface $S_1 l$ in the natural path courses of the right side end point and the left side end point of the tape are calculated in accordance with the following equation:

$$Por P_1 r_2 = Pol P_1 l_2 = \delta$$

where $P_0P_1r_2$ and $P_0P_1l_2$ are arc lengths on the natural courses, and $\delta$ is a predetermined distance for one step.

(6) A point $P_1$ on a shortest line $C_1$ among lines connecting the point $P_1r_2$ and $P_1l_2$ is calculated in accordance with the following equation:

$$P_1P_1r_2 = P_1P_1l_2$$

The point $P_1$ is the middle point of the tape in the next step of calculation.

(7) Points $P_1r$ and $P_1l$ on the line $C_1$ are calculated in accordance with the following equation:

$$P_1P_1r = P_1P_1l = W/2$$

The points $P_1r$ and $P_1l$ are right and left side end points in the next step of calculation.

(8) A shortest line $C_2$ among lines connecting the points $P_0$ and $P_1$ is calculated. A direction vector $V_1$ of the line $C_2$ on the surface $S_1$ is the affixing direction of the middle point of the tape in the next step of calculation.

(9) Affixing direction unit vectors $V_1r$ and $V_1l$ at the right and left side end points of the tape are obtained in the next step from relation between the surfaces $S_1$ and $S_1r$ and relation between the surfaces $S_1$ and $S_1l$.

(10) Then, the above operations (3) to (9) are successively repeated, whereby loci $P_0$, $P_1$, $P_2$, ... $P_n$ of the middle point of the tape are obtained. The loci is the natural path course for the tape.

In a case of an adhesion form having more complicated configuration, other control points are provided in addition to the opposite side end points so that the natural path course can be calculated more accurately.

Figure 13:
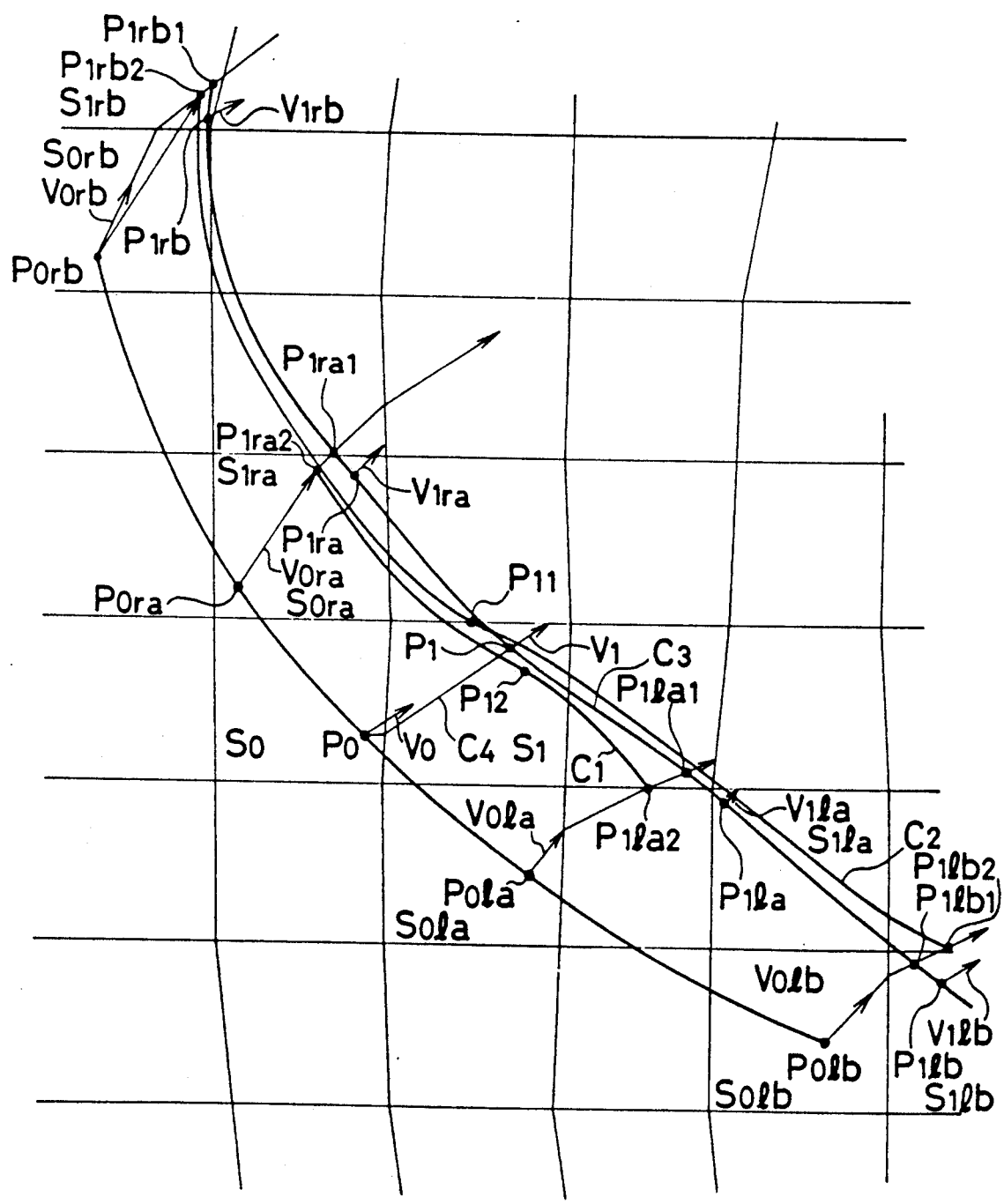

A calculation based on four controlling points will be described with reference to FIG. 13.

(1) A tape affixing direction vector $V_0$ at a starting point $P_0$ (the middle point of the tape) on the surface $S_0$ is calculated.

(2) Points $P_0ra$, $P_0la$, $P_0rb$ and $P_0lb$ (control points) on an intersecting line of a surface perpendicular to a surface of the adhesion form carrying $P_0$ and the surface of the adhesion form are calculated in accordance with the following equation:

$$P_0P_0ra = P_0P_0la = a$$

$$P_0P_0ra = P_0P_0lb = b$$

where a and b are values from 0 to 1/2W.

(3) affixing direction unit vectors $V_0ra$, $V_0la$, $V_0rb$ and $V_0lb$ at points $P_0ra$, $P_0la$, $P_0rb$ and $P_0lb$ are calculated from relation between the surface $S_0$ and the surfaces $S_0ra$, $S_0la$, $S_0rb$ and $S_0lb$.

(4) Natural paths of the control points are calculated based on the affixing direction vectors $V_0ra$, $V_0la$, $V_0rb$ and $V_0lb$ in a predetermined distance on one step.

(5) $P_1ra_2$, $P_1la_2$, $P_1rb_2$, $P_1lb_2$ are calculated whose respective distance from the control points are $\delta$ on the natural paths obtained in the operation (4).

(6) A point $P_{12}$ on a shortest line $C_1$ among lines connecting the points $P_1ra_2$ and $P_1la_2$ is calculated in accordance with the following equation:

$$P_{12}P_1ra_2 = P_{12}P_1la_2$$

Also, a point $P_{11}$ or a shortest line $C_2$ among lines connecting the points $P_1rb_2$ and $P_1lb_2$ is calculated in accordance with the following equation:

$$P_{11}P_1rb_2 = P_{11}P_1lb_2$$

From the above results, a point $P_1$ is calculated in accordance with the following equation:

$$aP_1P_{11} = bP_1P_{12}$$

(7) When vectors of the lines $C_1$, $C_2$ are $Vc_1$, $Vc_2$ (not shown) respectively, a vector $Vc$ for a line $C_3$ is calculated in accordance with the following equation:

$$Vc = \{a/(a+b)\}Vc_1 + \{b/(a+b)\}Vc_2$$

The line $C_3$ is calculated from the point $P_1$ both in the same direction and the reverse direction as the vector $Vc$ taking into the natural path of a widthwise direction of the tape.

(8) Points $P_1ra$ and $P_1la$, $P_1rb$, $P_1lb$ on the line $C_3$ are calculated in accordance with the following equation:

$$P_1P_1ra = P_1P_1la = a$$

$$P_1P_1rb = P_1P_1lb = b$$

The points $P_1ra$ and $P_1la$, $P_1rb$, $P_1lb$ are control points in the next step of calculation.

(9) A shortest line $C_4$ among lines connecting the points $P_0$ and $P_1$ is calculated. The affixing direction vector $V_1$ of the line $C_4$ on the surface $S_1$ is the affixing direction of the middle point of the tape in the next step of calculation.

(10) Affixing direction unit vectors $V_1ra$, $V_1la$, $V_1rb$ and $V_1lb$ at the control points $P_1ra$, $P_1la$, $P_1rb$ and $P_1lb$ of the tape are obtained in the next step of calculation from relation between the surface $S_1$ and surfaces $S_1ra$, $S_1la$, $S_1rb$ and $S_1lb$.

(11) Then, the above operations (3) to (10) are successively repeated, whereby loci $P_0$, $P_1$, $P_2$, ... $P_n$ of the middle point of the tape are obtained. The loci is the natural path course for the tape.

It could be seen that even if the number of control points is increased, calculation is basically the same. However, it is natural that the processing time of a computer increases as calculation amount increases. Accordingly, in actual use, the number of control points is determined by taking into consideration the complication of an adhesion form, required accuracy of tape clearance, required processing time, and others.

As described above, a method of the present invention in which a surface of an adhesion form is finely divided in the form of a lattice, a normal vector of each finely divided section (mesh area) and a vector of a ridge between finely divided sections is then calculated based on X-, Y-, Z- coordinate values of points in finely divided sections, the affixing direction vector of a control point of a tape is calculated from the normal vector and the ridge vector, and the moving course of a tape affixing head is controlled in accordance with the affixing direction vector makes it possible to calculate the natural path with high accuracy and ease, and then affix tape to various adhesion forms with high accuracy.

What is claimed is:

1. A method for controlling the tape affixing direction of an automatic tape affixing apparatus which apparatus includes a tape affixing head movable in X axis, Y axis, Z axis, A axis and C axis directions, and which also includes a control device for moving the tape affixing head on an adhesion form, the tape affixing head carrying tape, a tape supply reel, a tape take-up reel, a tape presser roller and a tape drive roller, the method comprising the steps of:

dividing the surface of said adhesion form into a lattice of fine sections, X-, Y-, and Z- coordinate data of the surface being stored in said control device;

calculating a normal vector of the surface of one fine section of said adhesion form and a normal vector of the surface of the next fine section in a general affixing direction based on X-, Y-, and Z- coordinate values of points on said fine sections;

calculating a ridge vector along a ridge between said two adjacent fine sections from said two normal vectors;

calculating an affixing direction vector of control points of said tape from said normal vectors and said ridge vector for said fine sections; and controlling the moving course of said tape affixing head in the X, Y, Z, A, and/or C axis direction, in accordance with said affixing direction vector and thereby applying said tape to the surface of said fine sections of said adhesion form.

2. A method according to claim 1 wherein said control points are set at a widthwise middle point of said tape.

3. A method according to claim 1 wherein said control points are set at both side ends of said tape.

4. A method according to claim 1 wherein said control points are set at a plurality of positions in a widthwise direction of said tape.

5. A method according to claim 1, wherein the step of calculating the normal and ridge vectors is started from a predetermined reference line, and the clearance between adjacent tape affixing courses is controlled on said reference line.

* * * * *